(12) United States Patent
Clarin et al.

(10) Patent No.: US 6,414,725 B1
(45) Date of Patent: Jul. 2, 2002

(54) METHOD AND APPARATUS FOR SYNCHRONIZED MULTIPLE FORMAT DATA STORAGE

(75) Inventors: Edsel A. Clarin, Diamond Bar; Hilton S. Creve, Culver City, both of CA (US); Richard A. Kupnicki, Thornhill (CA); Mihai G. Petrescu, Van Nuys; Todd S. Roth, Shadow Hills, both of CA (US)

(73) Assignee: Leitch Technology Corporation, Toronto (CA)

(*) Notice: Subject to any disclaimer, the term of this patent is extended or adjusted under 35 U.S.C. 154(b) by 0 days.

(21) Appl. No.: 09/061,236

(22) Filed: Apr. 16, 1998

(51) Int. Cl.$^7$ ................................................ H04N 9/64
(52) U.S. Cl. ................ 348/714; 348/714; 348/399.1; 348/446; 386/4; 386/27; 386/52; 386/109; 386/129; 386/131; 386/68
(58) Field of Search ................. 348/714, 589, 348/642, 659, 660, 397.1, 398.1, 399.1, 446; 386/109, 1, 112, 4, 27, 52, 129, 131, 68; H04N 9/64

(56) References Cited

U.S. PATENT DOCUMENTS

| | | | | |
|---|---|---|---|---|
| 4,685,003 A | * | 8/1987 | Westland | 360/14.1 |
| 5,307,456 A | * | 4/1994 | Mackay | 395/154 |
| 5,440,401 A | * | 8/1995 | Parulski et al. | 358/342 |
| 5,479,303 A | * | 12/1995 | Suzuki et al. | 386/70 |
| 5,546,118 A | * | 8/1996 | Ido | 348/714 |
| 5,684,990 A | | 11/1997 | Boothby | 395/619 |
| 5,974,218 A | * | 10/1999 | Nagasaka et al. | 386/46 |
| 6,055,019 A | * | 4/2000 | Takahashi | 348/642 |
| 6,064,796 A | * | 5/2000 | Nakamura et al. | 386/111 |
| 6,078,721 A | * | 6/2000 | Uchimi et al. | 386/111 |
| 6,118,930 A | * | 9/2000 | Hamai et al. | 386/112 |
| 6,137,953 A | * | 10/2000 | Fujiwara et al. | 386/109 |
| 6,160,915 A | * | 12/2000 | Kato et al. | 348/446 |
| 6,363,204 B1 | * | 3/2002 | Johnson et al. | 386/68 |

OTHER PUBLICATIONS

Pank, Bob. A Server Based Post–Production System. SMPTE Journal, Nov. 1996.

Ostlund, Mark. Multichannel Video Server Applications in TV Broadcasting and Post–Production. SMPTE Journal, Jan. 1996.

* cited by examiner

*Primary Examiner*—John W. Miller
*Assistant Examiner*—Linus H. Lo
(74) *Attorney, Agent, or Firm*—James J. Sterling; Mark B. Eisen

(57) ABSTRACT

A data storage system is described that simultaneously stores incoming data in a plurality of different digital formats linked together to permit economical accessibility and browsing of stored content by providing user access to reduced-resolution versions of stored format. Synchronization information correlates the same content stored in different digital formats to provide a means to reflect an edit of content in one format to the content stored in the other formats without manual editing of content in each format.

18 Claims, 2 Drawing Sheets

| Elevator Fire 4/1/1998 45 seconds CAFD19B6 | MPEG-1 6DFAEC HDTV 9FD6BDA | Motion JPEG 20 Mbps 1 video 2 audio | AB1CD04D188CDAB505 D8629DA9F8CAC8D9721 CBD9801D82DC72FF901 DCAB383DC89382220321 B3D784262DA9DFCDA9 |
|---|---|---|---|
| 12 | 13 | 14 | 15 |
| Identification | Association | Data Type | Payload |

FIG. 2

METHOD AND APPARATUS FOR SYNCHRONIZED MULTIPLE FORMAT DATA STORAGE

BACKGROUND OF THE INVENTION

This invention relates to a data storage system primarily for use as a digital video server in television broadcast and post-production facilities. In recent years, digital video servers have begun to revolutionize the television industry in much the same way as the introduction of the video tape recorder. Video servers have played a backstage role at many television facilities for years, first making their appearance to provide instant replay capabilities for broadcasts of sporting events.

A video server is essentially a high-speed data storage system with additional, dedicated hardware added. The additional hardware handles the functions of accepting signals in the North American Television Systems Committee (NTSC) format (consisting of a video signal and one or more associated audio signals) and sampling, quantizing and compressing the signals into a format suitable for digital storage. Other dedicated hardware decompresses the stored digital data and restores it to the original NTSC format signals.

Additional capability, often in software, may be provided to index, catalog and process the stored television signals. The extremely large amount of information contained in a television signal requires enormous amounts of magnetic disk storage to contain the digital representation of the video without visible distortion on playback. Substantial decreases in cost and advances in speed and performance of the disks and processing power required have made video servers increasingly popular in broadcast facilities. Advances in digital video compression have also reduced the cost and improved the quality of modern video servers.

One advantage of a video server is that, unlike a video tape recorder, a video server can record and play video simultaneously. If sufficient capability exists on the disk storage units and the internal data buses of the video server and enough compression and decompression hardware exists, multiple channels of video and audio can be recorded and played back at the same time. One example use of the video server is to start recording an interview with a winning athlete immediately at the conclusion of a sporting event while the broadcast station is transmitting a commercial message. When the commercial is completed, the broadcast station can then play the beginning of the recorded interview from the video server even though the video server is still recording the live interview. At the same time, journalists can be accessing the stored material, creating new video sequences by splicing the stored material with other stored material, and viewing the resulting new video sequence, transmitting it to other television facilities, or storing it to magnetic tape for later broadcast.

Although advances in computer, video compression, and magnetic storage have greatly reduced the cost and improved the recording quality of video servers, broadcast-quality video servers are still very expensive due to the fact that very high data rates are required to store high quality video without introducing visible distortion. This requires much faster hardware and larger disk capacities than that normally employed in computers designed for consumer-quality digital video. For example, many home computers can now easily play a single channel of MPEG-1 video at 1.5 to 3 million bits per second (Mbps). By comparison, a typical configuration of a broadcast video server will permit two channels of broadcast quality video, each channel requiring a record rate of around 20 Mbps, with no skips, pauses, or glitches.

When video servers are used in a networked environment to permit workstation access to the stored video for viewing and editing purposes, new problems arise. The common 10BaseT Ethernet networking standard permits a maximum data rate of 10 Mbps, insufficient for even a single channel of 20 Mbps video. The use of 100BaseT, with 100 Mbps capacity, theoretically increases this capability to 5 simultaneous channels maximum, although the actual capability is lower due to transport overhead, limiting the number of users who could simultaneously access stored material to 4.

The introduction of digital television (DTV) and in particular high definition television (HDTV), with data storage rates in excess of 45 Mbps, exacerbates the problem even further. However, even if the networking were not a problem, current video server designs will not support a large number of simultaneous accesses to the stored video content. One solution might be to duplicate the content across multiple video servers, but this would be extremely expensive and would still not be able to accommodate simultaneous requests from a large number of users on the network for a temporarily popular piece of content.

Yet another problem emerges with the requirement established by the U.S. Federal Communications Commission that television broadcast stations in the top U.S. markets be equipped to transmit digital television signals within a limited period of time. A typical television broadcast station represents the cumulative investment of millions of dollars and thousands of man-years of effort to create, transport, store, process and transmit a single, well known television format. The new regulations essentially require a new station to be built within the original in a fraction of the time that was taken to build the original station to perform the same functions with the new format. Television stations will need to accommodate the requirements of creating, storing and transmitting two different types of television signals. Initially, however, the new television signal will simply be the same content as the first, but in a converted format.

When stations first begin to transmit DTV, many stations will continue to create NTSC and simply convert NTSC to DTV just prior to broadcast, but as more and more content is created in DTV, stations will need to mix and manage the two types of content. Video servers will play an important role in helping television stations accomplish this task.

Although rapidly decreasing in price, the high cost of broadcast video servers restricts their use for direct to broadcast applications where time to air is critical and video tape recorders do not satisfy broadcast requirements. Video servers are highly effective for non linear editing applications, which allow specific points in a video clip to be accessed instantly, without having to quickly wind the tape through the intervening portions. However, the cost and bandwidth restrictions mentioned above put them out of reach of video journalists that might otherwise make use of the advanced editing capabilities.

SUMMARY OF THE INVENTION

The invention solves the problems of managing the storage of the same television content in multiple formats, creating and editing new clips composed of combinations of previously stored content in multiple formats simultaneously, and providing networked access to content stored on high-quality broadcast video servers by large numbers of users. The invention accomplishes this by storing incoming television signals consisting of video and associated audio in multiple different formats simultaneously. The different formats can be stored in a single data storage unit or in separate storage facilities.

Timing information is added to the different digital formats created so that synchronization between the stored formats can be established. This correlates a point in content recorded in one format with the same point in the corresponding clip recorded in another format. The timing information can then used by nonlinear editing software programs to duplicate editing changes made in one format to the same content stored in another format or formats.

Users on a networked system can browse and review content stored at a reduced bit rate using ordinary desktop computers. Utilizing editing software on the reduced resolution content, a user can create an edit decision list (EDL) with timing information embedded in the reduced-resolution format clip. The invention uses the synchronization information to apply the EDL to other stored formats of the same content without further user intervention. In this manner a user can create clips in multiple formats simultaneously by performing edits in a single, readily accessible format while the integrity of the high resolution format is maintained for broadcast purposes.

BRIEF DESCRIPTION OF THE DRAWINGS

In drawings which illustrate by way of example only a preferred embodiment of the invention, FIG. 1 schematically illustrates an example of a preferred embodiment of a system using the invention, and FIG. 2 illustrates an example o f one data storage organization according to the invention .

DETAILED DESCRIPTION OF THE INVENTION

Figure 1:
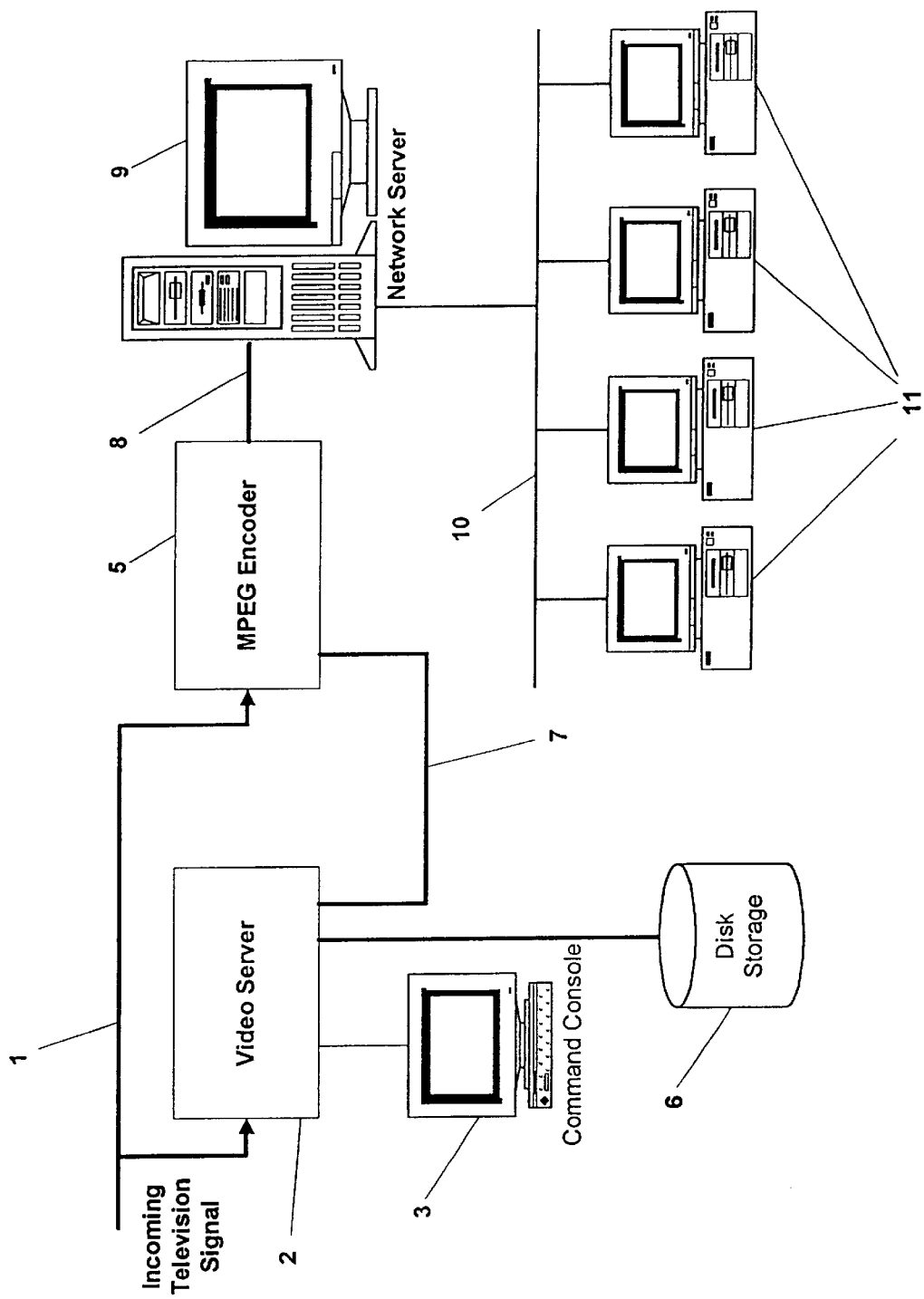

Shown in FIG. 1 is a preferred embodiment of a system using the invention. Video and audio input 1 is connected to a video server 2 such as a VR300 video server. The VR300 video server is a broadcast quality video server that stores incoming. standard NTSC television signals in a 20 Mbps motion-JPEG format for minimum distortion of the stored digital signal. The video and audio signal input to the VR300 may be in analog or digital format, for example D2 format, or the video may be in one format and the audio in the other format. When an operator instructs video server 2 to enter RECORD mode, such as by entering instructions on command console 3, the video server begins encoding the input audio and video into a high-resolution compressed data format such as motion-JPEG and stores the compressed video and audio data into disk storage unit 6, which is typically a high-performance disk array designed originally for network server applications. Video server 2 also catalogs the compressed video and audio data with identification information including timing and synchronization information, and stores this with the compressed video and audio data.

FIG. 2 shows a typical method of adding the required additional information. The video and audio data produced by the compression process is contained in data packets. The packet format is modified slightly to include the synchronization information. The first additional data field 12 contains identification information so that the system can identify the video and audio data. Second additional data field 13 contains association information to indicate where video and audio data corresponding to the same content stored in different formats is located. Third additional data field 14 describes the type of data contained in the packet. This field not only identifies the compression format used, but also can be used to identify different data rates of a particular format. For example, one packet may be identified as containing data in the MPEG-1 format at 3 Mbps, while another packet may indicate that the data contained is in the MPEG-1 format at 1.5 Mbps. Data field 15 contains the payload of the packet, the compressed video and audio data.

When entering RECORD mode, the video server also sends a message over the command network 7 to tell the MPEG encoder 5 to begin encoding the video and audio and the network server 9 to begin storing the encoded data. The MPEG encoder begins encoding the input audio and video into compressed MPEG-1 data format at a preferred data rate of 1.5 Mbps and transmits the resulting compressed video and audio data 8 into the network server 9. The MPEG encoder may be a card installed in the network server or a separate component. In the same manner as described above for the video server, the network server also stores the compressed video and audio data with identification information, including timing and other synchronization information.

Users can access the stored MPEG-1 content in the network server by sending requests to the network server over the user network 10 from workstations such as personal computers 11 by using readily available, inexpensive browser programs such as Netscape Navigator (Trademark). Since the network server is accessed through the browser in the same way as a World Wide Web page, the user interface is very familiar and easy to use. Through the browser, users can select content presented on catalog pages sent to the personal computer by the network server. The network server will then sends the selected television sequence to the use's personal computer in an MPEG-1 data stream. The browser-equipped personal computer will then convert the MPEG-1 data stream received from the network server back into video and audio format presentable to the user.

Using the same personal computer, users can also edit the, stored content with an editing program. Video recorders are linear devices requiring linear editing techniques, which means that playing two segments of a clip separated by undesired material requires that the tape be rewound or fast forwarded to the beginning of the second segment. The nonlinear nature of video servers permits the continuous playing of selected noncontiguous segments. Users can create new clips from combinations[ ]of other clips on the server by using a nonlinear editing program. The new clip can either be recorded as an entirely new segment, or as an edit decision list (EDL) which uses the timing and synchronization information to store indexes to selected segments of the clips in a desired sequence rather than the actual video and audio data of the selected segments of the clips. The EDL can then be employed later to create the new segment or simply play the new segment out of the server in real time directly to the transmitter or to a conventional videotape recorder.

By using the EDL created for one stored format of content and the association and timing information stored with each clip, the invention can convert the EDL for one stored format to a corresponding EDL for another stored format. In this manner, the user "virtually edits" the same clip in all formats stored by editing the clip in one format.

The invention provides a versatile and useful audio/video storage system which can be used to organize, store and edit audio/video content simultaneously in multiple formats. In order to simplify the description of the invention, we have presented a system in which only two types of formats were stored. Various modifications, alternate, constructions and equivalents may be employed without departing from the true spirit and scope of the invention. For example, the incoming signal may be split into a third chain, possibly employing additional conversion means, to store the incoming audio/video content into a third format, such as an HDTV format. The same association, timing and editing means is then employed to allow the user to browse and edit content that is reflected in three different formats, and have his edits viewable in any of the three formats. Therefore, the above description and illustrations should not be construed as limiting the scope of the invention which is defined by the appended claims.

We claim:

1. A data storage apparatus comprising:
   (a) a signal input to accept an incoming signal,
   (b) a first encoder connected to said signal input to encode said incoming signal at a first data rate and output a first data stream,
   (c) a data stage device connected to said first encoder to store said first data stream at said first data rate,
   (d) a second encoder connected to said signal input to encode said incoming signal at a second data rate and output a second data stream,
   (e) a data storage device connected to said second encoder to store said second data stream at said second data rate,
   (f) a processor connected to said first and second encoders and said data storage devices to generate and insert synchronizing information and compression format data into said data streams to correlate data points in said first data stream with corresponding data points in said second data stream, whereby data representing said incoming signal is stored in different formats and accessible for retrieval in said different formats, and whereby a segment in one of said first or second data stream can be precisely determined by reference to its corresponding segment in the other of said first or second data streams.

2. The data storage apparatus as claimed in claim 1 wherein the incoming signal is an analog NTSC television signal.

3. The data storage apparatus as claimed in claim 1 wherein the incoming signal is a digital television signal.

4. The data storage apparatus as claimed in claim 3 wherein the incoming digital video signal is in D2 format.

5. An audio/video signal storage apparatus comprising:
   (a) audio/video signal input to accept an incoming signal consisting of a video signal and one or more associated audio signals,
   (b) a first audio/video compressor connected to said audio/video signal input to compress said incoming audio and video at a first compression rate and output a first compressed audio/video data stream,
   (c) a first processor connected to said first audio/video compressor to add identification, timing and other synchronization information to said first compressed audio/video data stream,
   (d) a first data storage device connected to said first processor to store said first compressed audio/video data stream with added identification, timing and other synchronization information,
   (e) a second audio/video compressor connected to said audio/video signal input to compress said incoming audio and video at a second compression rate and output a first compressed audio/video data stream,
   (f) a second processor connected to said second audio/video compressor to add identification, timing and other synchronization information to said second compressed audio/video data stream,
   (g) a second data storage device connected to said second processor to store said second compressed audio/video data stream with added identification, timing and other synchronization information and compression format data, and
   (h) an editor connected to said first and second data storage devices to allow the selection of a segment of one of said first or second compressed audio/video data streams from a selected segment of we other of said first or second compressed audio/video data streams by comparing said identification, timing and other synchronization information and compression format data added to said first and second compressed audio/video data streams.

6. The audio/video signal storage apparatus as claimed in claim 5 wherein said first and second data storage devices are combined into a single data storage device.

7. The audio/video signal storage apparatus as claimed in claim 5 wherein said first and second processors are combined into a single processor.

8. The audio/video signal storage apparatus as claimed in claim 5 wherein said first and second data storage devices are combined into a single data storage device, and said first and second processors are combined into a single processor.

9. An audio/video storage method comprising the steps of:
   (a) transforming an input audio/video signal into a plurality of sequences of coded audio/video data at a plurality of differing coding rates, each of said plurality of sequences representing a complete coded representation of the said input audio/video signal,
   (b) storing said coded audio/video data at said plurality of differing coding rates in at least one storage device,
   (c) affixing indexing information to each of said plurality of sequences of coded audio/video data to add timing synchronization information and compression format data, and
   (d) creating associations between said timing synchronization information affixed to said plurality of sequences of coded audio/video data so that a predetermined portion of one of said plurality of sequences of coded audio/video data can be directly determined from the timing synchronization information corresponding to a predetermined portion of another one of said plurality of sequences of coded audio/video data, whereby data representing said input audio/video signal is accessible for retrieval by using said indexing information corresponding to any other of said plurality of sequences of coded audio/video data.

10. The data storage apparatus of claim 1 whereby at least one of said first or second data streams is stored as an edit decision list, wherein the timing and synchronization information and compression format data is stored as one or more indexes comprising data pointing to selected segments of the incoming signal in a selected sequence.

11. The audio/video signal storage apparatus of claim 5 whereby at least one of said first or second audio/video data streams is stored as an edit decision list, wherein the timing and synchronization information and compression format data is stored as one or more indexes comprising data poising to selected segments of the incoming signal in a selected sequence.

12. The method of claim 9 including the step of storing at least one of said first or second audio/video data streams as an edit decision list, wherein the timing and synchronization information and compression format data is stored as one or more indexes comprising data pointing to selected segments of the incoming signal in a selected sequence.

13. The data storage apparatus of claim 1 whereby an edit decision list of data points corresponding to segments of one of said first or second data streams may be created by translation of an edit decision list of data points selected by a user and corresponding to segments in the other of said first or second data streams using said synchronizing information and compression format data.

14. The data storage apparatus of claim 1 whereby one or more segments of one of said first or second data streams may be combined together by reference to an edit decision list corresponding to selected segments in the other of said first or second data streams.

15. The audio/video signal storage apparatus of claim 5 whereby an edit decision list corresponding to segments of one of said first or second compressed audio/video data streams may be created by translation of an edit decision list of segments selected by a user and corresponding to segments in the other of said first or second compressed audio/video data streams using said identifications timing and other synchronization information stored in said first and second data storage devices.

16. The audio/video signal storage apparatus of claim 5 whereby one or more segments of one of said first or second compressed audio/video data streams may be combined together by reference to an edit decision list corresponding to selected segments in the other of said first or second compressed audio/video data streams.

17. The method of claim 9 including the step of using said associations to translate an edit decision list of selected portions of one of said plurality of sequences of coded audio/video data into an edit decision list of selected portions of another of said plurality of sequences of coded audio/video data.

18. The method of claim 9 including the step of using said associations to select a fist set of one or more portions of one of said plurality of sequences of coded audio/video data from an edit decision list selecting a second set of one or more portions of another one of said plurality of sequences of coded audio/video data, said first set corresponding to the same audio/video content contained in said second set.

* * * * *